UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

PROCESS OF PRODUCING PHENOLIC CONDENSATION PRODUCTS.

1,368,753.　　　　　Specification of Letters Patent.　　Patented Feb. 15, 1921.

No Drawing.　　Application filed June 6, 1918. Serial No. 238,480.

*To all whom it may concern:*

Be it known that we, LAWRENCE V. REDMAN, a citizen of Canada, (who has taken out his first papers for citizenship in the United States,) residing at Evanston, Cook county, Ill., and ARCHIE J. WEITH and FRANK P. BROCK, citizens of the United States, residing at Chicago, in the county of Cook and State of Illinois, have invented a new and useful Improvement in Processes of Producing Phenolic Condensation Products, of which the following is a specification.

This invention relates particularly to the production of molded compounds comprising or containing a phenolic condensation product; and the primary object is to provide a practical method of producing such molded products by a quick-molding operation, without the necessity of preparatorily producing a phenolic condensation product for use in a quick-molding operation.

According to the process herein described, we mix together a suitable filler and a binder comprising materials adapted to produce, by an anhydrous reaction, a substantially anhydrous phenolic condensation product, the mixing operation being readily performed in a machine until a thoroughly homogeneous mass of plastic is produced; we then mold these materials by a quick-molding operation under suitable pressure, either at room temperatures or at any suitable temperature of the molds which will not interfere with rapid production; and we then subject the molded articles to prolonged heat treatment, preferably graduated, to avoid blistering or deformation of the molded article, the heat treatment being continued until the molded article becomes hard, resistant, and substantially infusible.

The following is given as an example of the preferred method: dissolve 75 pounds of hexamethylenetetramin in 300 pounds of cresol; mix the same with 600 pounds of asbestos pulp and 150 pounds of asbestos fiber, preferably of about ½ inch in length, the mixing operation being performed in a kneading machine until a thoroughly homogeneous mass of plastic is produced; introduce into the mixture, either initially, or before the kneading operation is completed, a substance adapted to give to the mass a desirable stiff plasticity, for example, a relatively small amount of asphalt dissolved in benzol; mold the material under pressure, preferably a pressure of several hundred pounds per square inch, in a quick-molding operation, using the molds either at room temperature, or heated in such manner as not to interfere with rapid work; and then remove the molded articles from the mold and subject them to prolonged heat treatment until a hard, resistant, and substantially infusible body results.

The heat treatment may be effected in an ordinary oven or kiln at atmospheric pressure, or may be *in vacuo*, or may be under moderate pressure, as desired. Ordinarily, the heat treatment will be performed at atmospheric pressure. The heat applied may range in temperature from room temperatures to 200° C. or higher. Preferably it is applied moderately at about 100° C. initially, and the temperature is raised either gradually or is raised moderately from time to time until the temperature of about 175° C. is attained, and the heating then continues at this temperature for a period of several hours. Usually, it is desirable to extend the heat treatment over a period of from ten hours to thirty hours, although, in the case of certain articles, and especially certain small articles not requiring the best results, the heat treatment may be considerably expedited. It may be added, however, that it is entirely practicable, for commercial production, to extend the heat treatment over a period of many hours at a comparatively insignificant expense, considering the value of the articles which can be produced. On the other hand, it is vastly important, in the interests of economical production of molded products, to be able to produce a very large output from each mold. This is accomplished by the short-molding process herein described, which renders it entirely practicable to increase the output, over the usual hot-molding process, from 50 to 75 fold.

It may be explained that a molding mixture may be produced as described above, omitting, however, the use of asphalt. With such omission, the mixture molds readily and conforms easily to the required shape. It has not, however, the stiff plasticity which allows it to maintain its form and at the same time be removed easily from the mold, especially if the binder is used in ample proportion to give the necessary strength to the final molded product. The stiffness of the plastic, as suggested, may be increased by decreasing the amount of binder. However, it is preferable to use sufficient binder to give ample strength to the molded product in its final form; and the stiff plasticity which is desirable may be produced by adding coal tar pitch, or the like, as described above. Instead of pitch, one may use other natural resins, such as copal, kauri, etc. The proportion of such resin employed may vary considerably.

A good molding mixture is produced by using, for example, 75% by weight of asbestos, 20% by weight of binder comprising the phenolic body and methylene body, and 5% by weight of asphalt, or the like.

The proportions of materials used may vary somewhat; and in case the molding mixture is not sufficiently mobile, or in case the binder-forming materials are insufficient in quantity to give the proper spreading or impregnating result, one may introduce into the mixture a quantity of creosote oil, or other suitable solvent material. A hydrocarbon solvent of high-boiling point produced by distillation of coal tar or asphalt may be used. Such oils comprise mainly cyclic hydrocarbons and have a varying boiling point, ranging say from 130° C. to 270° C. The oil may comprise a mixture of a number of cyclic hydrocarbons, such as naphthalene ($C_{10}H_8$), anthracene ($C_{14}H_{10}$), etc.

The process described is simple, economical, and enables high-grade molded products to be produced in large quantity with comparatively small equipment.

It has been proposed heretofore to impregnate a fibrous filler, wood or the like, with a mixture of a phenolic body and formaldehyde, and cause a synthetic action within the fibrous material. So far as we are aware, this has not proven practicable, and the proposed method has not come into use. Such proposed method is open to objection, both because the water employed in the formaldehyde solution and the water produced by the re-action of formaldehyde upon a phenolic body interfere with the production of a desirable product. The proposed process is open to the further objection that the formaldehyde is of a very volatile nature, which results in the escape of methylene, so that definite re-actions cannot be determined with certainty. The improved process herein described is free from both of these objections. There is no water present in the materials which form the binder (except that a negligible quantity may be present as an impurity), and no water is formed during the re-action. In other words, the re-action is anhydrous and is carried out substantially in the absence of water, with the elimination of ammonia as a by-product. The ammonia may be recovered and used in the manufacture of a fresh supply of hexamethylenetetramin.

Any suitable filler may be employed, such as asbestos, mica, flock, wood pulp, etc. If desired, wood, paper, or other fabrics may be impregnated with the materials adapted to produce a phenolic condensation product by anhydrous reaction; and the reaction may be caused to take place within the body of the impregnated article, by prolonged heat treatment, either at atmospheric pressure, in vacuo, or under moderate pressure. The molded articles may be subjected to heat treatment in a closed oven, or in an ordinary vulcanizer at substantially atmospheric pressure, or at any desired pressure, in which case the escape of phenol by evaporation or diffusion will be prevented, and if desired the oven or vulcanizer may be equipped with a valve which will permit the escape of ammonia which is evolved in the reaction and eliminated from the body undergoing treatment, and the ammonia may be collected and used again, for instance, in the manufacture of a fresh supply of hexamethylenetetramin. Also, if desired, the molded or pressed article may be dipped in high-boiling asphalt, or the like, prior to being subjected to the heat treatment, and will thereby acquire a coating which will prevent the escape of the phenolic body during the baking operation, but will permit the escape of ammonia from the body as the chemical reaction proceeds.

The proportions of hexamethylenetetramin and cresol in the example given above corresponds with about one mol of hexamethylenetetramin to six mols or cresol, thus providing about one methylene group for each phenolic group. Thus the materials may be initially mixed in proportions which will give a substantially infusible condensation product at the end of the heat treatment following the quick-molding operation. As has been stated, the proportions may be varied somewhat. It should be noted also that the use of a slowly-volatile solvent, that is, a solvent having a high boiling point, not only facilitates the operation of impregnating the filler, but also serves to temper the effect of the heat treatment which follows the molding operation, so as to avoid blistering or deformation of the molded article undergoing heat treatment. The use of any considerable amount of readily volatile solvent, such as alcohol, acetone, or the like, would tend to the opposite effect, that is, would tend to the production of a blistered article during the heat treatment, so that it is preferred to use readily volatile solvents sparingly, or not at all, and employ chiefly a slowly-volatile solvent, or a solvent of a high boiling point, if it be desired to so thin the binder as to economize in the use thereof, as, for instance, where a very high proportion of filler to binder is desired.

As indicated above, phenol, or a homologue, or any suitable phenolic body, may be employed in practising the process. Recognized equivalent bodies in the art are, for example, phenol, the cresols, and the xylenols. The most desirable active methylene body for use in the process is the methylene-amin compound hexamethylenetetramin. Another instance of a methylene-amin compound which might be used in the process is hydro-benzamid, or benzaldehyde-amin. It may be stated, however, that this latter substance is too expensive at the present time to be economically employed in the process.

The foregoing detailed description has been given for clearness of understanding only, and no unnecessary limitation should be understood therefrom, but the appended claims should be construed as broadly as permissible, in view of the prior art.

What we regard as new, and desire to secure by Letters Patent, is:

1. The process of producing an article of the character set forth, which comprises: impregnating a fibrous or cellular body with a binder comprising, in proportions to afford about one methylene group to each phenolic group, a phenolic body in unreacted condition and a methylene-amin body adapted to combine with said phenolic body in an anhydrous re-action with the evolution of ammonia compacting the impregnated body; and subsequently subjecting the impregnated body in compacted form to heat treatment for a prolonged period to effect such anhydrous re-action within said cellular body.

2. The process of producing an article of the character set forth, which comprises: impregnating a fibrous or cellular body with a binder comprising, in proportions to afford substantially one methylene group to each phenolic group, hexamethylenetetramin and an unreacted phenolic body capable of re-acting anhydrously therewith to form a condensation product; subjecting the impregnated body to a quick-molding operation under pressure; and applying heat to the molded body after removal from the mold to effect the main transformation of the material of said binder to a hard, resistant phenolic condensation product after such removal from the mold.

3. The process of producing a molded article, which comprises: mixing together a filler and a binder comprising, in proportions to afford about one methylene group to each phenolic group, a methylene-amin substance, a phenolic body in unreacted condition and adapted to combine anhydrously with the methylene substance to form a condensation product, and a natural resin adapted to impart stiffness to the molding compound; and subjecting the materials to a molding operation and heat treatment to form a body and transform it to a hard, resistant and substantially infusible state.

4. The process of producing a molded article, which comprises: mixing together a filler and a binder comprising, in proportions to afford about one methylene group to each phenolic group, a methylene-amin substance a phenolic body in unreacted condition which will re-act anhydrously with the methylene substance to form a condensation product, and a solvent having a high boiling point; subjecting the materials to a quick-molding operation without substantial hardening; and subjecting the molded body to heat treatment until it is transformed to a hard, resistant and substantially infusible state.

5. The quick-molding process of producing a molded article, which comprises: mixing together a filler and a binder comprising, in proportions affording about one methylene group to each phenolic group, a methylene-amin substance, an unreacted phenolic body adapted to combine therewith in an anhydrous re-action, a natural resin adapted to impart stiffness to the molding compound, and a hydro-carbon solvent having a high boiling point; subjecting the mixture to a quick-molding operation under pressure without substantial hardening; and subjecting the molded article to prolonged heat treatment after removal from the mold until it becomes hard and substantially infusible.

6. The process of producing a molded article, which comprises: mixing together a filler comprising asbestos and a binder comprising, in proportions to afford substantially one methylene group to each phenolic group, hexamethylenetetramin, an unreacted phenolic body capable of combining anhydrously therewith to form a condensation product, and a solvent of high boiling point, the asbestos being taken in excess by weight of the binder; and subjecting the mixture to a molding operation and heat treatment sufficient to convert the binder to a hard and substantially infusible state, the molding operation being performed under applied pressure.

7. The process of producing a molded phenolic condensation product, which comprises: mixing together a fibrous filler and a binder comprising materials adapted to react to form a hard, resistant and substantially infusible condensation product; subjecting said mixture to a quick-molding operation under applied pressure without substantial hardening; coating the molded product with a material which will tend to prevent escape of the phenolic body in the binder; and subjecting the coated molded product to prolonged heat treatment to convert the binder to a hard, resistant and substantially infusible state.

8. The process of impregnating loose fibrous material with an unreacted phenolic body and a methylene-amin substance which will re-act anhydrously therewith to form a condensation product substantially in proportions and in the manner described, and subjecting said mixture to forming and heat treatment substantially as described until a hard, resistant and substantially infusible body results.

LAWRENCE V. REDMAN.
ARCHIE J. WEITH.
FRANK P. BROCK.